(12) United States Patent
Rafferty et al.

(10) Patent No.: US 12,081,544 B2
(45) Date of Patent: Sep. 3, 2024

(54) SYSTEMS AND METHODS FOR PREVENTING UNAUTHORIZED NETWORK ACCESS

(71) Applicant: Capital One Services, LLC, McLean, VA (US)

(72) Inventors: Galen Rafferty, Mahomet, IL (US); Austin Walters, Savoy, IL (US); Jeremy Edward Goodsitt, Champaign, IL (US); Anh Truong, Champaign, IL (US); Ernest Kwak, Urbana, IL (US); Vincent Pham, Champaign, IL (US)

(73) Assignee: CAPITAL ONE SERVICES, LLC, Mclean, VA (US)

( * ) Notice: Subject to any disclaimer, the term of this patent is extended or adjusted under 35 U.S.C. 154(b) by 338 days.

(21) Appl. No.: 17/170,024

(22) Filed: Feb. 8, 2021

(65) Prior Publication Data

US 2022/0255929 A1 Aug. 11, 2022

(51) Int. Cl.
H04L 9/40 (2022.01)

(52) U.S. Cl.
CPC ........ H04L 63/0876 (2013.01); H04L 63/102 (2013.01); H04L 63/107 (2013.01)

(58) Field of Classification Search
CPC .. H04L 63/0876; H04L 63/102; H04L 63/107
See application file for complete search history.

(56) References Cited

U.S. PATENT DOCUMENTS

| | | | |
|---|---|---|---|
| 9,565,472 B2 | 2/2017 | Hybertson | |
| 9,825,928 B2 | 11/2017 | Lelcuk et al. | |
| 10,021,088 B2 | 7/2018 | Innes et al. | |
| 10,057,227 B1* | 8/2018 | Hess | G06F 21/31 |
| 10,129,912 B2 | 11/2018 | Tinnakornsrisuphap et al. | |
| 10,231,268 B2* | 3/2019 | Pathuri | H04W 8/26 |
| 10,560,975 B2 | 2/2020 | Kim et al. | |
| 2016/0165651 A1* | 6/2016 | Pathuri | H04W 8/26 370/329 |
| 2018/0359244 A1 | 12/2018 | Cockerill et al. | |
| 2019/0044942 A1* | 2/2019 | Gordon | H03M 13/3972 |
| 2019/0319965 A1* | 10/2019 | Brown | H04L 63/0492 |
| 2019/0364034 A1* | 11/2019 | Alexander | H04L 63/12 |

\* cited by examiner

*Primary Examiner* — Harris C Wang
(74) *Attorney, Agent, or Firm* — TROUTMAN PEPPER HAMILTON SANDERS LLP; Christopher J. Forstner; John A. Morrissett

(57) ABSTRACT

A system configured to execute instructions to perform steps of a method for preventing unauthorized network access is disclosed. The system may receive an authorization request from a first user device and determine a device fingerprint. The system may store the device fingerprint as an authorization fingerprint. The system may receive a login request from a second user device. When the authorization fingerprint matches the device fingerprint, the system may authorize the login request from the second user device. In some embodiments, the system may determine a device state and temporal identifier and create a first device hash to be stored as an authorization hash. The system may receive a login request and cause the first user device to create one or more second device hashes. If at least one second device hash is a match, the system may authorize the login request from the second user device.

20 Claims, 5 Drawing Sheets

SYSTEMS AND METHODS FOR PREVENTING UNAUTHORIZED NETWORK ACCESS

FIELD OF INVENTION

The present disclosure relates to systems and methods for determining the authenticity of a user login request, and more particularly providing systems and methods for preventing unauthorized network access by determining an authorization fingerprint or hash value and determining whether a device fingerprint or device hash value matches the authorization fingerprint or hash value.

BACKGROUND

Electronic transactions such as money transfers, bill payments, and purchases are commonly initiated using a remote device via the Internet. Although financial service providers typically require login credentials to authenticate the identity of a user attempting to initiate such a transaction, those login credentials can be compromised by hacking, identify theft, and other such means. Additionally, many third-party applications may attempt to access electronic accounts on behalf of a user with the user's login credentials. However, allowing third-parties access to sensitive user accounts leads to reduced security for the user. In response, financial service providers may attempt to provide additional means of authenticating a user, such as attempting to verify that the user is initiating the transaction using a known and/or commonly used device or network.

For example, a financial service provider may detect and track the external Internet Protocol (IP) address, Basic Service Set Identifier (BSSID), or Service Set Identifier (SSID) of a device or network over the course of multiple transactions to determine whether there is consistency in the device and/or network that is being used to initiate the transactions in association with the particular customer login credentials. If the system detects that the user is attempting to login from a device or network that is unknown or not commonly used, then the system may determine that there is an increased potential that the attempt to initiate the transaction may be fraudulent. However, this additional method of attempting to assess the legitimacy of the device/network/transaction may be insufficient, because external IP addresses, BSSIDs, and SSIDs may easy to spoof or may be fooled by the presence of a virtual private network (VPN) or other such means of obfuscating or misrepresenting the identity of the network used by the remote device, allowing scammers to impersonate the device and/or network to circumvent this additional security check.

Accordingly, there is a need for improved systems and methods for providing network security by determining an authorization fingerprint or hash value based on a known user device and upon receiving a login request form a secondary device, determining whether a device fingerprint or device hash value matches the authorization fingerprint or hash value.

SUMMARY

Disclosed embodiments provide systems and methods for enhancing network security.

Consistent with the disclosed embodiments, the system may include one or more memory devices storing instructions, and one or more processors configured to execute the instructions to perform steps of a method of preventing unauthorized network access. The system may execute the instructions to receive an authorization request from a first user device and scan the first user device to determine a device fingerprint. The system may store the device fingerprint as an authorization fingerprint. The system may receive a login request from a second user device. The system may determine whether the first user device is within a predetermined proximity to the second user device and that the authorization fingerprint matches the device fingerprint beyond a predetermined threshold. The system may authorize the login request based upon a determination that the first user device is within a predetermined proximity to the second user device and that the authorization fingerprint matches the device fingerprint beyond a predetermined threshold.

Consistent with the disclosed embodiments, methods for enhancing network security are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

Figure 1:
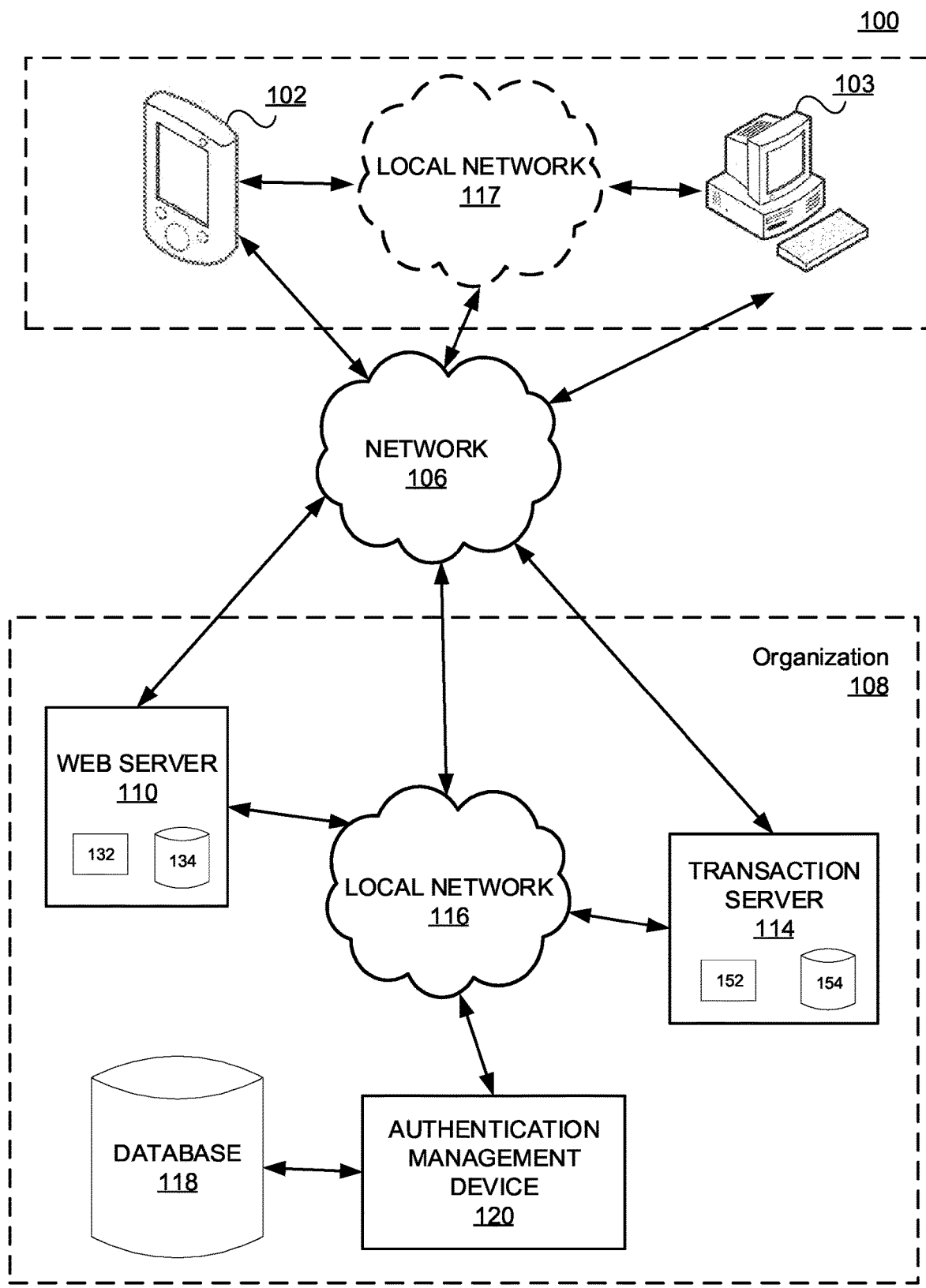
FIG. 1 is a diagram of an exemplary system that may be used to provide network security.

FIG. 1 is a diagram of an exemplary system 100 that may be configured to perform one or more processes that may provide network security by determining an authorization fingerprint associated with a known first device associated with the user and upon receiving a login request from a second device, determining whether the first device fingerprint matches beyond a predetermined threshold and whether the first device is within a predetermined proximity to the second device and allowing access in response to the determinations. In some embodiments, the system may determine an authorization hash value in lieu of an authorization fingerprint, and may allow access when a first device hash or one or a plurality of first device hashes matches the authorization hash. The components and arrangements shown in FIG. 1 are not intended to limit the disclosed embodiments as the components used to implement the disclosed processes and features may vary. As shown, system 100 may include a first user device 102, a second user device 103, a network 106, and an organization 108 including, for example, a web server 110, a transaction server 114, a first local network 116, a second local network 117, a database 118, and a authentication management device 120.

In some embodiments, a customer may operate a first user device 102 and/or one or more secondary user devices 103 (which may also simply be referred to as user devices). User devices 102, 103 can include one or more of a mobile device, smart phone, general purpose computer, tablet computer, laptop computer, telephone, PSTN landline, smart wearable device, voice command device, other mobile computing device, or any other device capable of communicating with a first local network 117, network 106, and ultimately communicating with one or more components of organization 108. In some embodiments, a user device may include or incorporate electronic communication devices for hearing or vision impaired users. User devices 102, 103 may belong to or be provided by a customer, or may be borrowed, rented, or shared. Customers may include individuals such as, for example, subscribers, clients, prospective clients, or customers of an entity associated with organization 108, such as individuals who have obtained, will obtain, or may obtain a product, service, or consultation from an entity associated with organization 108. According to some embodiments, user devices 102, 103 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors. In some embodiments, user devices 102, 103 may include applications or software that may determine network identification data associated with the hosting device and/or one or more connected devices that may be transmitted to system 100 (e.g., to web server 110).

For example, according to some embodiments, a user device 102 initiating a remote transaction with organization 108 may include a software application that enables user device 102 to obtain device identification data and location data associated with user device 102, and network identification data from local network 117 (and associated devices such as routers, modems, etc.), and other user devices 103 that are connected to local network 117 or otherwise networked with user device 102. As will be appreciated by those of skill in the art, a software application such as, for example but not limited to, nmap, NetCat, Packet Sender, or the like, may utilize port scanning and host discovery capabilities to obtain network identification data from one or more networked devices. According to some embodiments, user device 102 may obtain network information data by retrieving data from other devices on the local network 117 by either connecting to the other devices or reading the data they broadcast. In some embodiments, user device may obtain device information by retrieving data from internal storage of user device 102. For example, WAN and LAN IP addresses may be stored by user device 102, as well as device identifying data such as operating system (OS) versions, installed application data, media access control (MAC) address, application history, etc. and may thus be retrieved from the internal storage of user device 102, whereas IP addresses of other devices 103 on the local network 117 may have to be ascertained by user device 102 connecting to the other devices 103. In some embodiments, user device 102 and user device 103 may not be both connected to local network 117. In some embodiments, user device 102 and user device 103 may be networked directly through network 106 and ultimately be in communication with organization 108.

In some embodiments, the device identification data collected by user device 102 may be transmitted from user device 102 to web server 110. For example, in some embodiments, user device 102 may be a mobile phone that includes a mobile application that may activate certain features or functions of mobile device 102 to collect device identification data from user device 102 and other devices 103 connected to local network 117. According to some embodiments, after obtaining device identification data, the mobile phone may transmit the device identification to web server 110. In some embodiments, device identification data collected by the user device 102 may be transmitted from user device 102 to web server 110. For example, collected by user device 102 may be transmitted from user device 102 to web server 110. For example, in some embodiments, user device 102 may be a mobile phone that includes a mobile application that may activate certain features or functions of mobile device 102 to collect device identification data from device 102 and/or device 103 connected to local network 117.

According to some embodiments, user device 102 may include software tools that may enable user device 102 to collect device data and location data from and/or associated with user device 102, local network 117, and/or one or more other devices 103 connected to local network 117.

According to some embodiments, device data may include for example, without limitation, operating system (OS) version, mobile application version, MAC addresses associated with user devices 102,103 (e.g., MAC addresses associated with cellular and WiFi connectors), storage size, information relating to device caches (e.g., L1, L2, L3 caches) such as the sizes of hardware caches storage in bytes, device management profiles (i.e., applications installed on a device to manage what the end user can do with the device, as well as handling pre-installing applications, pre-configuring network and/or VPN settings, limiting the use of certain applications, etc.), screen size, installed applications, RAM information such as the size of RAM in bytes and/or the type of RAM, processor information such as the manufacturer, model, speed, and other such characteristics of the processor, camera statistics, and Windows DOMAIN (i.e., a string of characters that represents the domain name used to bind the device to active directory servers that manage accounts centrally instead of locally on each device).

In some embodiments, location data collected may include, without limitation, WAN IP, connected SSID(s), disconnected stored SSID(s), location services/GPS information, Bluetooth™ connections to other devices, disconnected paired Bluetooth™ devices, and trace routes (i.e., a log of all of the servers between a sending device and a receiving device associated with a target IP address, which may include IP addresses, DNS names, response times, and other such data associated with the intermediate servers).

In some embodiments, device data may include for example, without limitation, LAN IP(s) (including v4/v6), MAC addresses (e.g., MAC addresses of a LAN, WAN, and or other connected devices), open/closed/filtered ports, OS fingerprinting, bonjour services, UPnP, host name(s), services, vendor, and DNS servers. As those of skill in the art will recognize, Bonjour and UPnP are zero-configuration networking standards designed to make it easy for users to find devices (such as other computers or printers) on a local network without knowing the technical information required to connect to them. Host names may be human readable alternatives to IP addresses that may be used to more easily and dynamically point to a device. According to some embodiments, a DNS server connected to the network may be capable of resolving a host-name into an IP address to allow devices to connect to one another. In some embodiments, services may be gathered via open/closed/filtered port statuses on a device. For example, when a port is open or filtered it may be inferred that a service is running on that port, and other details of the packets sent to and from the port may reveal what version of a service is being run on the port. Further, in some embodiments, various ports of a device may be reserved for certain services. For example, port 22 is commonly used for Secure Shell (SSH). According to some embodiments, vendor may be determined from a MAC address and/or open ports. DNS servers are a list of IP addresses or domain names that a network may use by default to resolve domain and host names into IP addresses.

According to some embodiments, the device data and/or location data collected by user device 102, 103 may be collected in association with one or more user devices 102, 103, routers, modems, or other devices connected to, or used to operate local network 117 such as mobile phones, tablets, computers, game consoles, ebook readers, or any IoT device such as lights, cameras, vacuums, AC units, speakers, or any other such device having the capability of connecting to network 117.

Network 106 may be of any suitable type, including individual connections via the internet such as cellular or WiFi networks. In some embodiments, network 106 may connect terminals, services, and mobile devices including by using direct connections such as radio-frequency identification (RFID), near-field communication (NFC), Bluetooth™, low-energy Bluetooth™ (BLE), WiFi™, ZigBee™, ambient backscatter communications (ABC) protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Organization 108 may be associated with an entity such as a business, corporation, individual, partnership, or any other group that provides one or more of goods, services, and consultations to individuals who are or potentially are consumers of those goods, services, and consultations.

Organization 108 may include one or more servers, devices, and computer systems for performing one or more functions associated with products and/or services that organization 108 provides. Such servers, devices, and computer systems may include, for example, web server 110, transaction server 114, and authentication management device 120, as well as any other computer systems necessary to accomplish tasks associated with organization 108 or the needs of customers (which may be customers of the entity associated with organization 108).

Web server 110 may include a computer system configured to generate and provide one or more websites accessible to customers, as well as any other individuals involved in organization 108's normal operations. Web server 110 may include a computer system configured to receive communications from a user device 102 via for example, a mobile application, a chat program, an instant messaging program, a voice-to-text program, an SMS message, email, or any other type or format of written or electronic communication. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices (e.g., authentication management device 120) of system 100. In some embodiments, web server 110 may host websites or applications that may be accessed by one or more user devices 102, 103. For example, web server 110 may host a financial service provider website that a user device may access by providing customer credentials that are authenticated by web server 110. Web server 110 may provide functionality to allow an authenticated user to execute transactions, such as initiating money transfers, bill payments, and other such financial service transactions. In some embodiments, web server 110 may be configured to deny an attempted transaction (e.g., deny a login attempt) or issue a security challenge to user device 102 (e.g., requesting a second factor authentication) in response to a determination that a first device fingerprint does not match an authentication fingerprint beyond a predetermined threshold. In some embodiments, web server 110 may be configured to deny an attempted transaction (e.g., deny a login attempt) or issue a security challenge to user device 102 (e.g., requesting a second factor authentication) in response to a determination that a first device hash value does not match an authentication hash value. In some embodiments, web server 110 may be configured to deny an attempted transaction (e.g., deny a login attempt) or issue a security challenge to user device 102 (e.g., requesting a second factor authentication) in response to (i) a determination that a first device fingerprint does not match an authentication fingerprint beyond a predetermined threshold and (ii) that the verified first user device is not within a predetermined distance to the second user device being used to request the attempted transaction. According to some embodiments, web server 110 may include software tools, similar to those described with respect to user device 102 above, that may allow web server 110 to obtain device and location identification data from user device 102, and/or one or more other devices 103 connected to local network 117

Transaction server 114 may include a computer system configured to process one or more transactions involving an account associated with a customer, or a request received from customers. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that an entity associated with organization 108 provides to individuals such as customers. Transaction server 114 may have one or more processors 152 and one or more transaction server databases 154, which may be any suitable repository of transaction data. Information stored in transaction server 114 may be accessed (e.g., retrieved, updated, and added to) via local network 116 and/or network 106 by one or more devices (e.g., authentication management device 120) of system 100. According to some embodiments, transaction server 114 may store transaction data that may be used by the system 100 to assist in generating an authentication fingerprint and/or device fingerprint. According to some embodiments, transaction server 114 may store transaction data that may be used by the system 100 to assist in generating an authentication hash and/or device hash.

In some embodiments, transaction server 114 tracks and stores event data regarding interactions between a third party, such as third-party server, with organization 108, on behalf of the individual. For example, transaction server 114 may track third party interactions such as purchase requests, refund requests, warranty claims, account withdrawals and deposits, and any other type of interaction that the third-party server may conduct with organization 108 on behalf of an individual such as a customer.

Local networks 116, 117 may comprise any type of computer networking arrangement used to exchange data in a localized area, such as WiFi, Bluetooth™ Ethernet, and other suitable network connections that enable components of organization 108 or user devices 102, 103 to interact with one another and to connect to network 106 for interacting with components in system environment 100. In some embodiments, local networks 116, 117 may comprise an interface for communicating with or linking to network 106. In other embodiments, components of organization 108 may communicate via network 106, without a separate local network 116. In some embodiments, local network 117 may comprise a home network, such as a LAN or WLAN set up in a user's house. In some embodiments, local network 117 may be commonly used network of a local business, such as, for example, a Wi-Fi network at a particular coffee shop. In some embodiments, user device 102 and user device 103 may communicate directly via network 106 without a separate local network 117.

According to some embodiments, database 118 may be a database associated with organization 108 and/or its related entity that may store a variety of information relating to customers, transactions, customer credentials, customer networks and devices, and business operations. Database 118 may also serve as a back-up storage device and may contain data and information that is also stored on, for example, local databases associated with web server 110, transaction server 114, and authentication management device 120. Database 118 may be accessed by other devices (e.g., authentication management device 120) and may be used to store records of every interaction, communication, and/or transaction a particular customer has had with organization 108 and/or its related entity, including historical network identification data associated with the previous customer interactions.

Authentication management device 120 may include a computer system configured to generate a device fingerprint and/or authentication fingerprint based in part on network identification data. In some embodiments, a network identification data may represent an estimate of confidence that a local network 117 used by a user device 102 to initiate a transaction in association with a particular set of customer credentials is the actual network that it appears to be in relation to some network-identifying information (such as, a purported external IP address of local network 117) transmitted to organization 108 in association with the attempted transaction initiated by user device 102 in association with the particular set of customer credentials. In some embodiments, the device fingerprint and/or authentication fingerprint may be used to generate a device hash value (or a series of device hash values associated with configurations of user device 102/103 at different temporal periods) and/or an authentication hash value. As will be appreciated, in various embodiments, the device fingerprint and/or authentication fingerprint score may have different formats, scales (e.g., linear, exponential, etc.), or data types, and the preceding examples are in no way limiting. According to some embodiments, the network identification data may be representative of information associated with, for example, local network 117 and/or one or more user devices (e.g., user devices 102, 103) connected to or associated with local network 117. According to some embodiments, authentication management device 120 may generate an authentication fingerprint and/or device fingerprint based on recently collected network identification data in addition to previously collected network identification data that may include known devices, known networks, and known locations. In some embodiments, authentication management device 120 may use a footprint model to track device attributes over time to iteratively update a device fingerprint associated with the state of the device at a certain point in time. For example, authentication management device 120 may generate an initial footprint the first time a user successfully authenticates a first user device 102 to login to an account (e.g., via web server 110) in association with a particular set of customer credentials. The initial footprint may include an initial set of device data and location data that represents all of the detectable devices that are connected to the local network 117 and their attributes.

For example, if a user uses a mobile device 102 connected to a local network 117 to login to an account (e.g., to initiate a transaction), system 100 (e.g., via web server 110) may detect that there is also a laptop computer 103*a* and a tablet device 103*b* connected to the local network 117. System 100 may collect initial device data and location data, on all three user devices 102, 103*a*, 103*b*, as well as any other devices that are connected to network 117 such as routers, repeaters, modems, game consoles, TV set top boxes IoT devices such as light bulbs, speakers, cameras, washing machines, and any other type of device that is capable of connecting to network 117, and use this information to create an authentication fingerprint of user device 102. The initial footprint may indicate which devices are connected to the network and what the attributes of those devices are (e.g., OS version, screen size, MAC address, etc.). According to some embodiments, the next time a second user device 103 attempts to log into an account or initiate a transaction in association with the particular set of customer credentials, system 100 (e.g., via web server 110) may request a device fingerprint from user device 102 to determine whether the login request is authentic or may be related to an attempted spoof of the user's identity by one or more third party applications. The system may additionally determine whether first user device 102 is within a predetermined distance to the second user device 103 (e.g., by determining whether the first user device 102 is connected to a same local network 117 as second user device 103, and/or by determining the location of first user device 102 via a GPS signal and comparing the location of the first user device 102 to the location of second user device 103 as determined by an IP address of second user device 103).

In some embodiments, a device data fingerprint may represent a comparison of the features, device specifications, software versions, and data of a user device 102 from an initial footprint to a current footprint. According to some embodiments, location data may be generated based on any location services running on user device 102, which may obtain location information in a variety of ways, such as through GPS, cell-tower triangulation, IP address, other such location data points, or a combination thereof.

Although the present disclosure describes the creation of authentication fingerprints and/or device fingerprints score by processing various input data points using one or more algorithms, it should be understood that the process used to generate a network confidence score may vary among different embodiments, and may further vary over time as the system 100 may use machine learning techniques to refine the algorithms and input data used. Accordingly, the algorithms used by system 100 may be flexible and adaptive. In some embodiments, the algorithm may weight one or more particular data points or scores more heavily than others in generating the authentication fingerprint and/or device fingerprints. The weighting of data points may be manually changed by an operator of system 100 or may be automatically changed by implementing machine learning techniques on system 100. For example, highly conserved device data may be preferable for the generation of device and authorization fingerprints. Highly conserved device data may include hardware component device data (e.g., processor type, GPU, etc.), OS type, and/or device storage profiles. Accordingly, in some embodiments, authentication management device 120 may maintain an authentication fingerprint that is updated over time as device information changes. In some embodiments, authentication management device 120 may use artificial intelligence learning techniques to modify the algorithm used to generate an authentication fingerprint over time. In some embodiments, authentication management device may be configured to determine a device hash value based upon device identification data received from the first user device 103. The device hash value may be based upon only a portion of device identification data that is most likely to be conserved in day to day use of the device. After a successful login from a first user device, authentication management device 120 may be configured to save the device hash as an authentication hash. The authentication hash may be a hash value that is based in part on the device identification information as it exists on the first user device 102 for a specific moment in time. The next time a second user device 103 attempts to log in to organization 108 using the same credentials, the first user device 102 may be prompted to create a new device hash value. The new device hash value may be compared to the authentication hash value to determine whether to grant access to the user account. In some embodiments, the request from authentication management device 120 for the first user device 102 to create a new device hash value includes a temporal identifier (e.g., a timestamp) that identifies to the first user device the temporal period associated with the state of the device (and device identification data) that the authentication hash value is based upon. Accordingly, the first user device may use the device identification data associated with the respective temporal period to generate the new device hash value, which may be compared to the authentication hash to determine whether to grant access to the second user device attempting to access the user account associated with organization 108. In some embodiments, the request for the first user device to generate a new hash value may not include a temporal identifier. Instead, the first user device may generate a plurality of hash values each associated with a specific temporal period (e.g., 1 hour ago from present, 1 day before present time, 1 week before present time, etc.). The first user device may transmit the plurality of hash values to the authentication management device 120 and if at least one of the transmitted plurality of hash values matches the authentication hash, the system may allow access to the user account by the second user device 103.

In some embodiments, the temporal identifier (e.g., timestamp) may be used to deny an authentication request despite the device hash matching the authentication hash value. For example, the time stamp may also indicate a geolocation and/or time zone associated with the login request. If a first login authorization includes a timestamp associated with New York City, and a subsequent login authorization attempt includes a timestamp indicative of Los Angeles being the source of the subsequent login authorization, the subsequent login authorization may be denied when the system determines that the change in geolocation is too large for the amount of time passed between the first login authorization and the subsequent login authorization attempt, even if the device hash value matches the authorization hash.

Authentication management device 120 may be further configured to initiate a security action based on whether the first device fingerprint/first device hash value matches the authentication fingerprint/authentication hash value. According to some embodiments, a security action may include denying an attempted transaction or login attempt, issuing a security challenge, or allowing an attempted transaction or login attempt. According to some embodiments, if authentication management device 120 denies an attempted transaction or login attempt, authentication management device 120 may transmit a message to web server 110 and/or transaction server 114 to cause the denial of the login attempt or transaction. In some embodiments, issuing a security challenge may include, for example, sending a message, such as a text message, email, or phone call, to an account or device associated with the user of the customer credentials used to attempt a login or transaction, and requesting the user to provide verification information to validate the attempted transaction or login attempt. For example, system 100 may challenge the user to provide security information such as a temporary pin number or answering a security question.

Although the preceding description describes various functions of user devices 102, 103, web server 110, transaction server 114, database 118, and authentication management device 120, in some embodiments, some or all of these functions may be carried out by a single computing device.

For ease of discussion, embodiments may be described in connection with the determining the authenticity of a login request in the context of a device that is attempting to initiate a transaction, such as a financial transaction. It is to be understood, however, that disclosed embodiments are not limited to determining the authenticity of a login request in the context of an attempt to execute a transaction, but may be applied to any circumstance in which a remote device 102, 103 is interacting with an organization 108 and it may be desirable to attempt to verify that the remote device 102, 103 is actually connecting to organization 108 via the local network 117 that it appears to be using. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

Figure 2:
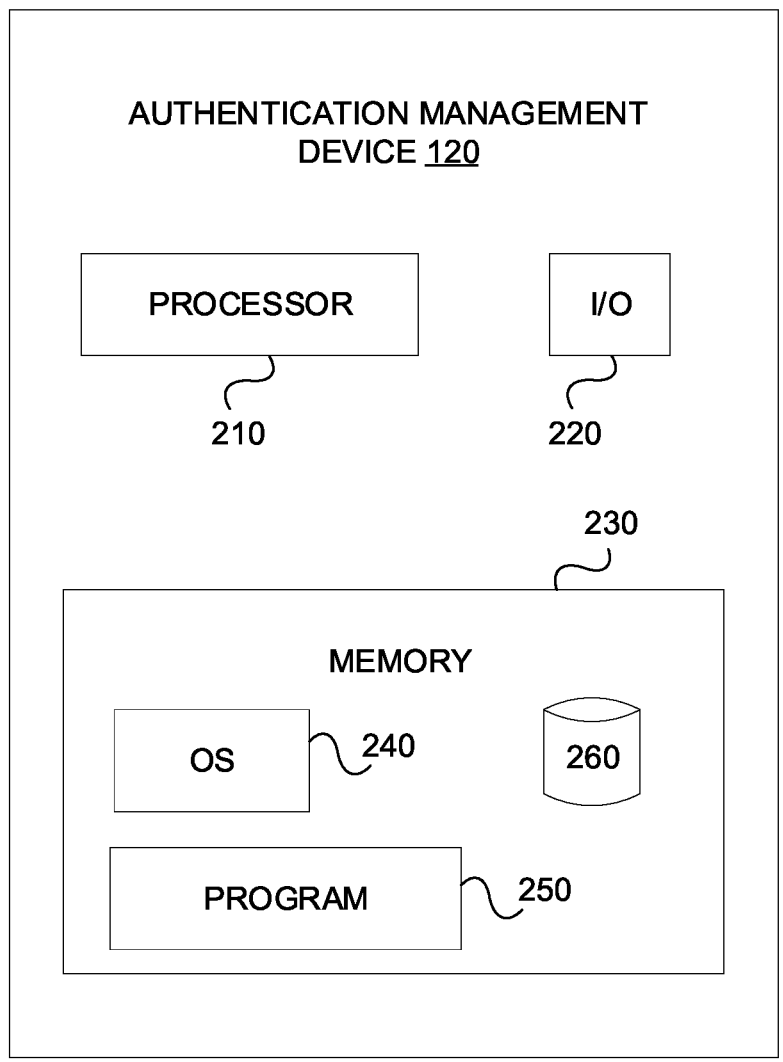
FIG. 2 is a component diagram of an exemplary authentication management device.

An exemplary embodiment of authentication management device 120 is shown in more detail in FIG. 2. Web server 110, call center server 112, transaction server 114, and/or user devices 102, 103 may have a similar structure and may include many components that are similar to or even have the same capabilities as those described with respect to authentication management device 120. As shown, authentication management device 120 may include a processor 210, an input/output ("I/O") device 220, a memory 230 containing an operating system ("OS") 240 and a program 250. For example, authentication management device 120 may be a single device or server or may be configured as a distributed computer system including multiple servers, devices, or computers that interoperate to perform one or more of the processes and functionalities associated with the disclosed embodiments. In some embodiments, authentication management device 120 may further include a peripheral interface, a transceiver, a mobile network interface in communication with the processor 210, a bus configured to facilitate communication between the various components of authentication management device 120, and a power source configured to power one or more components of authentication management device 120.

A peripheral interface may include hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, a local area network, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to components requiring power.

Processor 210 may include one or more of a microprocessor, microcontroller, digital signal processor, co-processor or the like or combinations thereof capable of executing stored instructions and operating upon stored data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Authentication management device 120 may include one or more storage devices configured to store information used by processor 210 (or other components) to perform certain functions related to the disclosed embodiments. In some embodiments, authentication management device 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, authentication management device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, authentication management device 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments. In some embodiments, authentication management device 120 may include an authentication fingerprint program 250 that is a rules-based program for generating a device fingerprint and/or authentication fingerprint. In some embodiments, the authentication fingerprint program 250 may be further configured to determine and generate an authentication hash and device hash to determine whether an access request should be granted. In some embodiments, the device fingerprint matching the authentication fingerprint may represent an estimate of confidence that the local network that a user device 102 and/or 103 appears to be using (e.g., local network 117) to attempt to initiate a transaction by interacting with organization 108 is actually the local network being used by user device 102. According to some embodiments, the identity of the local network that user device 102 appears to be using may be determined from an IP address associated with user device 102, an IP address associated with a router of the local network being used by user device 102, an external IP address, the BSSID of a network, and/or an SSID of a network. In some embodiments, authentication management device 120 may determine whether the first user device is within a predetermined distance to the second user device based upon the identity of the local network that both the first user device and the second user device are connected to (e.g., local network 117).

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a database 260 for storing related data to enable authentication management device 120 to perform one or more of the processes and functionalities associated with the disclosed embodiments.

Authentication management device 120 may also be communicatively connected to one or more memory devices (e.g., databases) locally or through a network. The remote memory devices may be configured to store information and may be accessed and/or managed by authentication management device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Authentication management device 120 may also include one or more I/O devices 220 that may comprise one or more interfaces for receiving signals or input from devices and providing signals or output to one or more devices that allow data to be received and/or transmitted by authentication management device 120. For example, authentication management device 120 may include interface components, which may provide interfaces to one or more input devices, such as one or more keyboards, mouse devices, touch screens, track pads, trackballs, scroll wheels, digital cameras, microphones, sensors, and the like, that enable authentication management device 120 to receive data from one or more users.

In exemplary embodiments of the disclosed technology, authentication management device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While web server 110, call center server 112, transaction server 114, and authentication management device 120 have been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASIC s), programmable logic arrays, state machines, etc. Furthermore, other implementations of the web server 110, call center server 112, transaction server 114, and authentication management device 120 may include a greater or lesser number of components than those illustrated.

Figure 3:
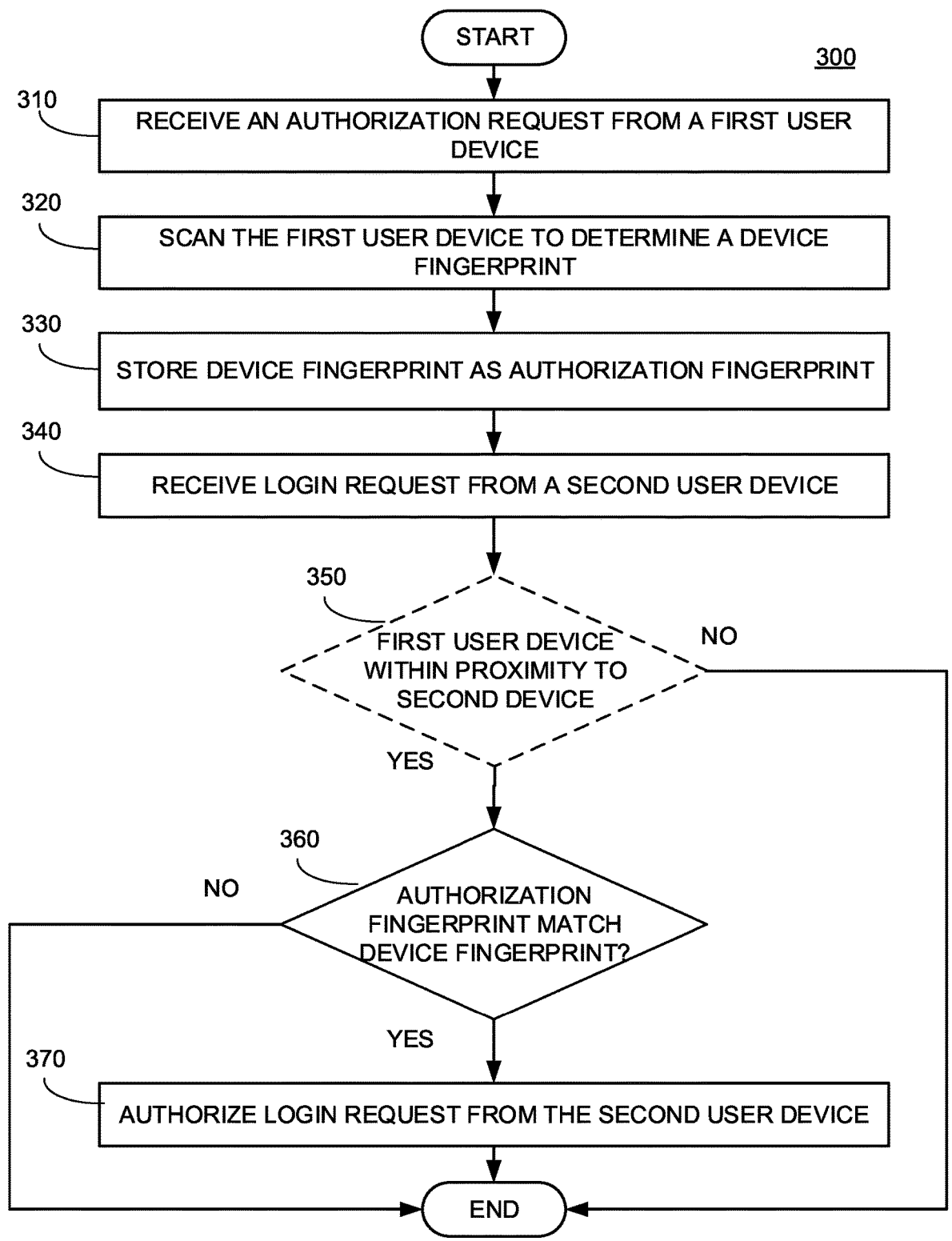
FIG. 3 is a flowchart of an exemplary system for providing network security.

FIG. 3 shows a flowchart of a method 300 for preventing unauthorized network access. Method 300 may be performed by some or all of user devices 102, 103, web server 110, transaction server 114, database 118, and authentication management device 120.

In block 310, system 100 (e.g., via web server 110) may receive an authorization request from a first user device (e.g. user device 102). An authorization request may refer to, for example, a registration with the system 100 required before a user device 102 may be used for a financial transaction, such as transferring money, payment of a bill, closing an account, or an attempt to login to a website account (e.g., via web server 110) associated with a financial account of the user. The financial account may include user credentials which must be input into the user device 102 to access the financial account. For example, customer credentials may include a login name, an account number, a password, a pin number, an answer to a security question, or any other piece of information that may be used to verify the identity of a user or a user device (e.g., user device 102). According to some embodiments, the user device (e.g., user device 102) may be on a local network (e.g., local network 117). For example, a mobile phone 102 may be connected to a home Wi-Fi network 117 or a Wi-Fi network of a local business, and a mobile application of the mobile phone may enable the mobile phone 102 to access a web site (e.g., via web server 110) to attempt to login to a financial account. The user may input customer credentials into the mobile application of the mobile phone 102 and user device 102 may transmit the customer credentials to organization 108 (e.g., via web server 110).

In block 320, system 100 (e.g., via authentication management device 120) may scan the user device (e.g., user device 102) to determine a device fingerprint. For example, in some embodiments, a software program or mobile application housed on user device 102 may gather device identification data associated with user device 102 and other user devices 103a, 103b, and any other device (such as routers, modems, etc.) that are connected to or included in the local network 117. The software program or mobile application may be granted permission by the user of user device and may then query any number of device configuration characteristics, which may be stored as device identification data. As previously described above, in some embodiments, device identification data may include device data and location data. In some embodiments, the device identification data may be received from user device 102 or another device connected to or included in the local network 117. According to some embodiments, network identification data may be collected by web server 110. According to some embodiments, the system may utilize all or a portion of the collected device identification data from user device 102 and use the collected data to generate a unique authentication identifier known as the device fingerprint. The device fingerprint may represent a complex collection of data associated with user device 102 at a particular point in time. In some embodiments, the device fingerprint may be further based upon utilizing a hashing algorithm to determine a hash value based on all or a portion of the collected device fingerprint data.

In block 330, the system 100 may store the device fingerprint as an authorization fingerprint. The authorization fingerprint may include a temporal identifier (e.g., a timestamp) that identifies the time at which the device identification data was analyzed to create the authorization fingerprint. In some embodiments, the device fingerprint is stored as an authorization fingerprint in response to the user inputting user credentials matching stored credentials on organization 108 (e.g., stored on database 118 by authentication management device 120).

In block 340, the system 100 may receive a login request from a second user device (e.g., user device 103). According to some embodiments, user device 103 may be a device with which the user of the second user device has not accessed an account associated with organization 108 previously. In order to prevent unauthorized access (e.g., via a third-party application having access to user credentials), the system may require a fingerprint authentication from pre-registered user device 102 to allow the user access to the financial account or transaction from user device 103. Accordingly, system 100 (e.g., authentication management device 120) may query the first user device (e.g. user device 102) to transmit a device fingerprint which may be compared to the stored authentication fingerprint before granting access to the second user device (e.g., device 103). According to some embodiments, the system may determine which categories of device data are most likely to be conserved over time, and use this conserved data to generate the device fingerprint and the stored authorization fingerprint. For example, the system may identify hardware configuration parameters as likely to be highly conserved (e.g., processor type/model, MAC address associated with the device, highly conserved system files, and/or archival data such as stored documents, photos, etc.) and use the highly conserved device data to generate the device fingerprint and authorization fingerprint. According to some embodiments, when the device fingerprint is a near match to the authorization fingerprint, the system may authorize the login request. For example, an operator of the system may manually set a predetermined similarity threshold such that if the device fingerprint is, for example, a 95% match or greater to the authorization fingerprint, the system may authorize the login request.

In optional decision block 350, the system may determine whether the first user device 102 is within a predetermined proximity to the second user device 103. In some embodiments, the first user device and the second user device may be connected to local network 117, and the first user device may be queried by authentication management device 120 to transmit an indication that the first user device 102 and second user device 103 are both currently connected to local network 117. In some embodiments, the first user device 102 may be queried by the authentication management device 120 to transmit GPS coordinates, which may be compared to a location for second user device 103, which may be determined via GPS coordinates or, when user device is currently connected to local network, location data for the second user device 103 may be determined based on a location associated with the IP address of local network 117 (e.g., the IP address associated with a router or user device 103 when connected to local network 117). When the first user device 102 is not within a predetermined proximity to the second user device 103 the method may end. When the first user device 102 is within a predetermined to the second user device 103, the method may move to block 360.

In decision block 360, system 100 (e.g., authentication management device 120) may determine whether the received device fingerprint matches the authorization fingerprint beyond a predetermined threshold. When the received device fingerprint matches the stored authorization fingerprint beyond a predetermined threshold, the method may move to block 370. When the received device fingerprint does not match the stored authorization fingerprint beyond a predetermined the method may execute one or more security measures. According to some embodiments, the security action may be one of, for example, denying the attempted transaction, issuing a security challenge, allowing the attempted transaction, flagging the transaction for further review, initiating extended logging of the session for fraud analysis, or redirection of the connection to a honeypot server. Authentication management device 120 may be configured to cause the security action to be executed. For example, authentication management device 120 may send an instruction to web server 110 or transaction server 114 to deny or allow an attempted login or transaction. Further, authentication management device 120 may be configured to transmit a security challenge to an account or device associated with a user associated with the customer credentials received in block 310. According to some embodiments, if the device fingerprint match score is below a predetermined threshold, authentication management device 120 may determine that the security action is to deny the attempted transaction or login. According to some embodiments, if fingerprint match score is above a predetermined threshold, authentication management device 120 may determine that the security action is to allow the attempted transaction or login. According to some embodiments, if the fingerprint match score is below a first predetermined threshold and above a second predetermined threshold, authentication management device 120 may determine that the security action is to issue a security challenge. In some embodiments, authentication management device 120 may include a program or software that includes an algorithm for determining the security action based on the calculated similarity between the authentication fingerprint and the device fingerprint received from the first user device (e.g. user device 102). According to some embodiments, the predetermined thresholds may be different based on the type of transaction being requested. For example, a minimum predetermined threshold for gaining access to viewing a balance may be lower than the predetermined threshold for transferring funds. According to some embodiments, predetermined thresholds may be adjusted over time by, for example, an operator of system 100 or automatically using machine learning techniques. According to some embodiments, an attempted transaction may be associated with tiered thresholds such that meeting different thresholds results in different outcomes. For example, one threshold may be associated with no challenged being issued (i.e., access being granted), another threshold may be associated with an easier security challenge such as requesting the user to enter a pin, another threshold may be associated with a more difficult security challenge such as requiring the user to call a call center or presenting second factor authentication, and yet another threshold may be associated with denying access to the transaction entirely.

In block 370, in response to the device fingerprint received from the first user device (e.g., user device 102) matching the authentication fingerprint beyond a predetermined threshold (and in some embodiments, additionally in response to the first user device being within a predetermined proximity to the second user device), system 100 (e.g., authentication management device 120) may allow the login request from the second user device. In some embodiments, the system may additionally create a second device fingerprint from the second user device (e.g. user device 103) in order to allow a user of the second user device to login without requesting a device fingerprint from the first user device during future login attempts.

Figure 4:
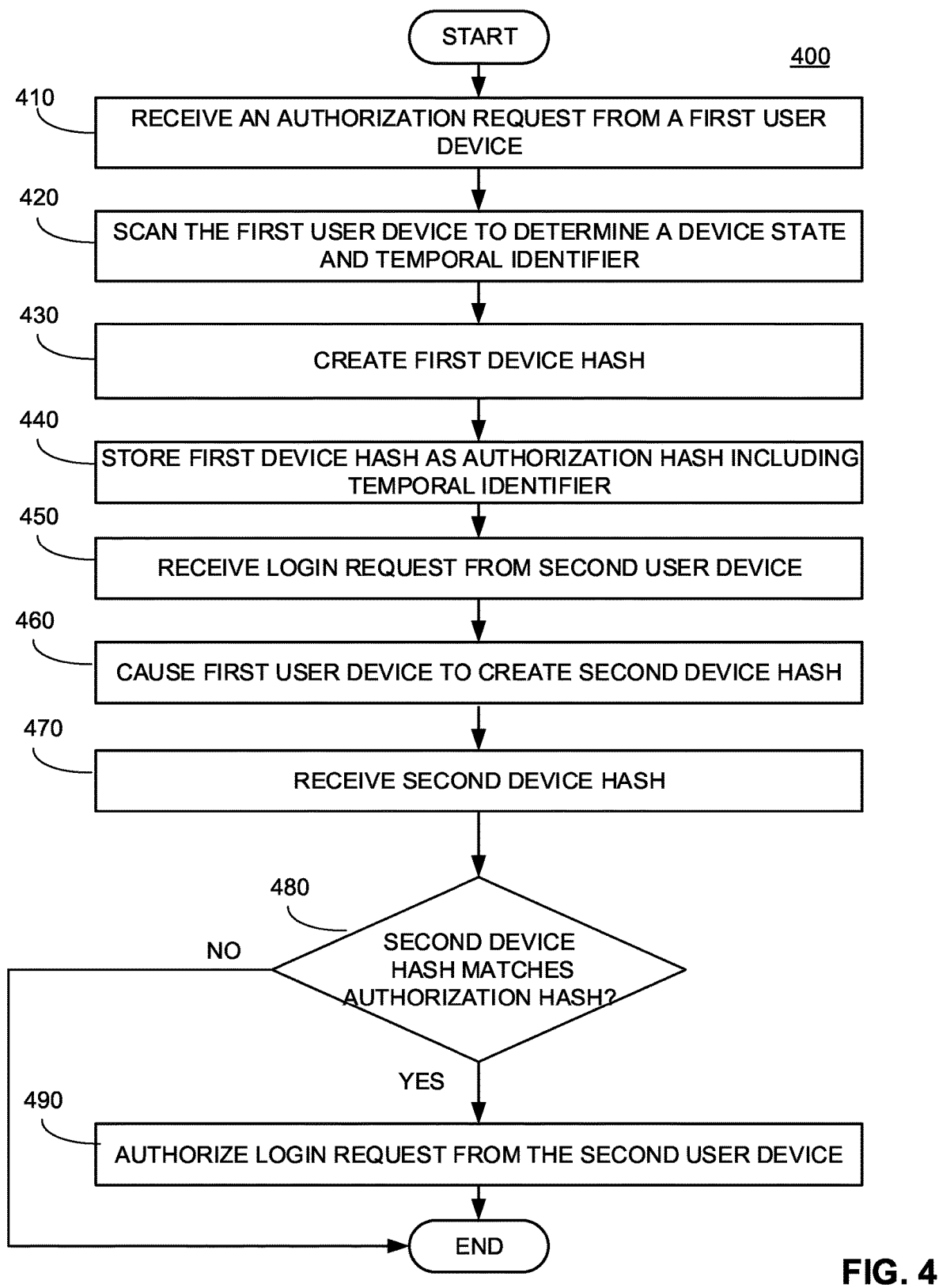
FIG. 4 is a flowchart of a method for preventing unauthorized network access.

FIG. 4 shows a flowchart of a method 400 for preventing unauthorized network access using a device hash value. Method 400 may be performed by some or all of user devices 102, 103, web server 110, transaction server 114, database 118, and authentication management device 120.

In block 410, system 100 (e.g., via web server 110) may receive an authorization request from a first user device (e.g. user device 102). Block 410 may be similar to block 310 and a full description is omitted here for brevity.

In block 420, system 100 (e.g., authentication management device 120) may scan the user device to determine a device state and temporal identifier. The device state may be based on the previously described device identification data, including device data and location data. In some embodiments, the temporal identifier may be a timestamp associated with the received device identification data that identifies a time period associated with the device state.

In block 430, according to some embodiments, the system may utilize all or a portion of the collected device identification data from the first user device (e.g., user device 102) and use the collected data to generate a unique hash value known as the first device hash value. The first device hash value may represent a complex collection of data associated with user device 102 at a particular point in time. In some embodiments, the first device hash value may be further based upon utilizing a hashing algorithm to determine a hash value based on all or a portion of the collected device fingerprint data. In some In block 440, system 100 may store the first device hash as an authorization hash. In some embodiments, the stored authorization hash may further include the temporal identifier allowing system 100 (e.g., authentication management device 120) to recognize the specific time during which the authentication hash was generated. Before the first device hash may be stored as the authorization hash, the user may be prompted to provide user credentials to verify that it is the user attempting the login to organization 108, and not an unauthorized login attempt by a third party.

In block 450, system 100 may receive a login request from a second user device (e.g., user device 103). According to some embodiments, a second user device (e.g., user device 103) may be a device with which the user of the second user device has not accessed an account associated with organization 108 previously. In order to prevent unauthorized access (e.g., via a third-party application having access to user credentials), the system may require a hash value verification from pre-registered user device 102 to allow the user access to the financial account or transaction from user device 103.

In block 460, system 100 may cause the first user device to create a second device hash. The second device hash may be based on device identification data currently existing on the first user device (e.g., device 102) that is pre-registered with organization 108. Similar to the first device hash, the second device hash may include a temporal identifier (e.g., a timestamp) that identifies when the second hash value was created.

In block 470, system 100 (e.g., authentication management device 120) may receive the second device hash from the first user device (e.g., user device 102). Accordingly, system 100 (e.g., authentication management device 120) may query the first user device (e.g. user device 102) to transmit the second device hash which may be compared to the stored authentication hash before granting access to the second user device (e.g., device 103).

In decision block 480, the system may determine whether the second device hash matches the authorization hash. When the second hash matches the authorization hash, the system may authorize the login request from the second user device (e.g. user device 103) in block 490. When the second hash does not match the authorization hash, the method may end with the system denying the login request.

Figure 5:
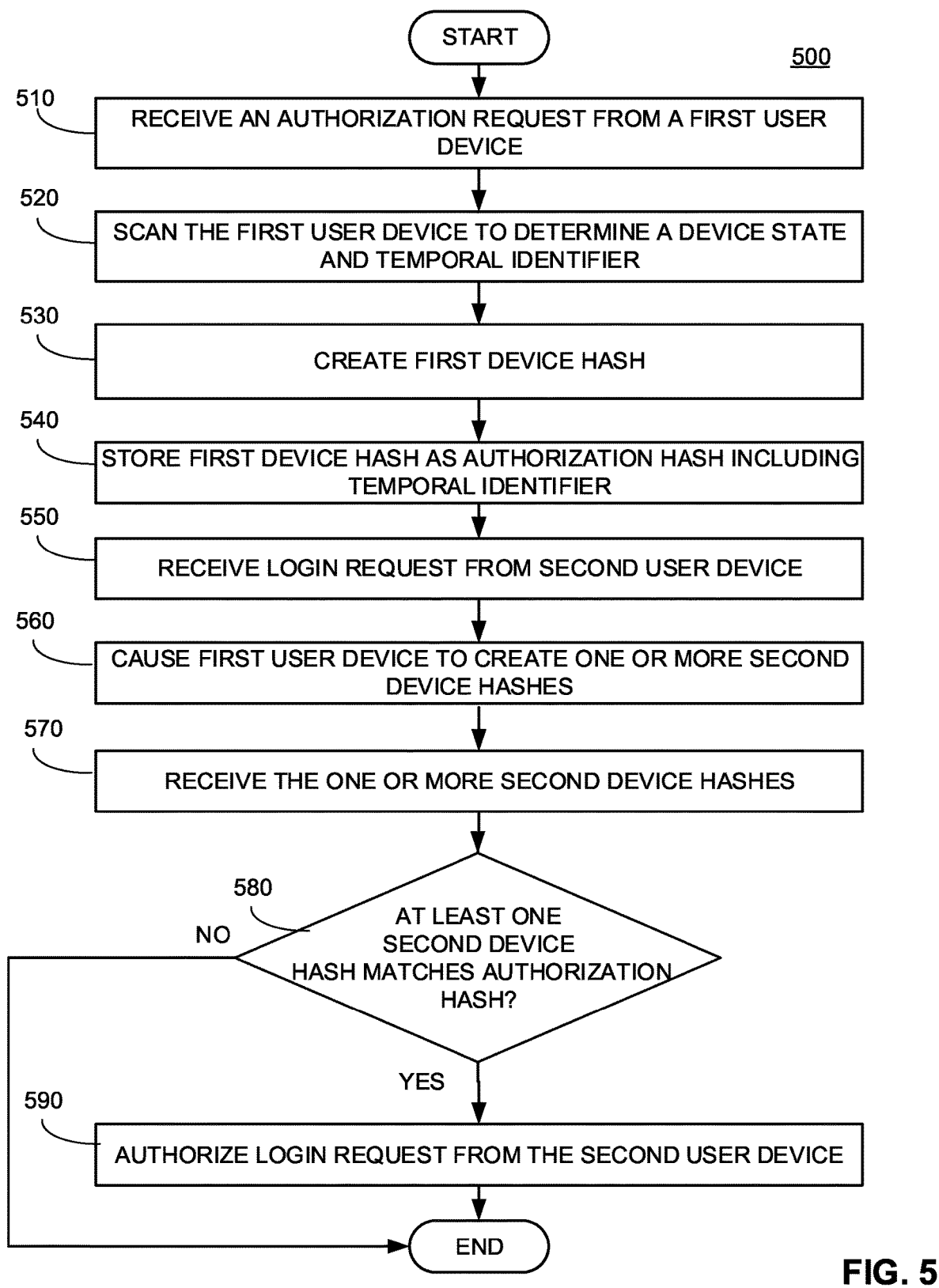
FIG. 5 is a flowchart of another method for preventing unauthorized network access.

FIG. 5 shows a flowchart of a method 500 for preventing unauthorized network access using a plurality of hash values. Method 500 may be performed by some or all of user devices 102, 103, web server 110, transaction server 114, database 118, and authentication management device 120. Blocks 510, 520, 530, 540, and 550 are substantially similar to blocks 410, 420, 430, 440, and 450, respectively, and so a full description is omitted here for brevity.

In block 560, system 100 (e.g. authentication management device 120) may cause the first user device to create one or more second device hashes. For example, the one or more second device hash may be based on device identification data currently existing on the first user device (e.g., device 102) that is pre-registered with organization 108. The first user device may generate a plurality of hash values, each hash value being associated with a different time period (e.g., having a different temporal identifier). Accordingly, the plurality of hash values may correspond to a variety of previous time periods associated with the state of the first user device at those previous time periods. Similar to the first device hash, each of the second device hashes may include a temporal identifier (e.g., a timestamp) that identifies the time period "snapshot" on which the hash value was based on. Accordingly, a second device hash including a temporal identifier associated with the device state 24 hours ago would be based on device identification data as it existed 24 hours ago.

In block 570, system 100 (e.g., authentication management device 120) may receive the one or more second device hashes. Accordingly, system 100 (e.g., authentication management device 120) may query the first user device (e.g. user device 102) to transmit the one or more second device hash which may be compared to the stored authentication hash before granting access to the second user device (e.g., device 103).

In decision block 580, the system may determine whether at least one of the second device hashes matches the authorization hash. When at least one of the second hash matches the authorization hash, the system may authorize the login request from the second user device (e.g. user device 103) in block 590. When the second hash does not match the authorization hash, the method may end with the system denying the login request.

EXEMPLARY USE CASES

The following exemplary use cases describe examples of a typical user flow pattern. They are intended solely for explanatory purposes and not in limitation. A financial service provider may be concerned with preventing third party spoofing applications from gaining unauthorized network access using customer credentials given to the third party by the customer. For example, users of financial service providers may use third party applications that attempt to login and scrape financial data from the financial service providers, which reduces network security and should be prevented. To do so, the financial security provider may require a user to initially pre-register a first user device (e.g., user device 102) before allowing the user to access the financial service provider services from the first user device. The pre-registration process may include requiring the user to enter user login credentials into the first user device, and additionally may include scanning the first user device to identity device identification data. The device identification data may be used by the system (e.g. authentication management device 120) to generate a unique device identifier based on the device identification data, called a device fingerprint. Once a device fingerprint is created, and if the inputted user credentials match those stored by the financial service provider, the device fingerprint may be stored as an authorization fingerprint. Next time the user attempts to login to the financial service provider from an unrecognized device, the system may query the first user device to generate a device fingerprint, which may be transmitted to system 100. Then, system 100 may compare the authentication fingerprint to the device fingerprint and when they match beyond a predetermined threshold, allow the transaction. Optionally, as an additional layer of security, the system may also require the first device to be within a predetermined proximity to the second user device. In this case, the system may receive GPS coordinates from the first user device and compare the location of the first user device to a location of the second user device. The second user device location may be determined based on GPS coordinates, or via an IP address associated with the login request from the second user device. When the first user device and the second user device are within a predetermined proximity and the device fingerprint from the first user device matches the authentication fingerprint, the system may grant the login request from the second user device. In some embodiments, the second user device may be queried to generate its own second device fingerprint, which may additionally be stored by the system as an authentication fingerprint following a successful login from the second user device. Accordingly, a successful login attempt according to this method would pre-register the second user device for a more convenient and direct login the next time the user attempts to login to financial service provider from the second user device.

Examples of the present disclosure relate to systems and methods for preventing unauthorized network access to prevent third-party screen scraping tools. In one aspect, a system for preventing unauthorized access is disclosed. The system may implement a method according to the disclosed embodiments. The system may include one or more processors, and a memory in communication with the one or more processors and storing instructions, that when executed by the one or more processors are configured to cause the system to perform steps of a method according to the disclosed embodiments. For example, the system may receive an authorization request from a first user device. The system may scan the first user device to determine a device fingerprint. The system may store the device fingerprint to the memory as an authorization fingerprint. The system may receive a login request from a second user device. The system may determine whether (i) the first user device is within a predetermined proximity to the second user device and (ii) the authorization fingerprint matches the device fingerprint beyond a predetermined threshold. In response to (i) the first user device being within a predetermined proximity to the second user device and (ii) the authorization fingerprint matching the device fingerprint beyond a predetermined threshold, the system may authorize the login request from the second user device.

In some embodiments, determining whether the first user device is within a predetermined proximity to the second user device may further include receiving a GPS signal from the first user device, determining an IP address associated with the second user device, and determining whether the GPS signal of the first user device is within the predetermined proximity to a source location of the IP address associated with the second user device.

In some embodiments, determining whether the first user device is within a predetermined proximity to the second user device may further include determining whether the first user device is connected to a same local network as the second user device.

In some embodiments, determining whether the first user device is within a predetermined proximity to the second user device may further include determining whether the first user device is within a connectable range to the second user device via a short-range wireless communication protocol.

In some embodiments, determining the device fingerprint and authorization fingerprint may further include scanning the first user device to determine a device state and an associated temporal identifier, creating a first device hash based on the determined device state, storing the first device hash to the memory as an authorization fingerprint, and causing the first user device to create a second device hash based on the device state associated with the temporal identifier.

In some embodiments, the device fingerprint is determined based on one or more of an operating system (OS) version, a screen size of the first user device, a mobile application version, one or more installed applications on the first user device, a media access control (MAC) address associated with the first user device, a processor type of the first user device, application history associated with the first user device, camera statistics associated with the first user device, and device management profiles associated with the first user device.

In some embodiments, the system may be configured to execute one or more security actions in response to (i) the first user device not being within a predetermined proximity to the second user device or (ii) the authorization fingerprint not matching the device fingerprint beyond a predetermined threshold. The one or more security actions may include request a second factor authentication before authorizing the login request from the second user device. The one or more security actions may further include denying the login request from the second user device.

In another aspect, a method for preventing unauthorized access is disclosed. The method may include receiving an authorization request from a first user device. The method may include scanning the first user device to determine a device state and an associated temporal identifier. The method may include creating a first device hash based on the determined device state. The method may include storing the first device hash to a memory as an authorization hash. The authorization hash may include the temporal identifier. The method may include receiving a login request from a second user device. In response to the login request, the method may include causing the first user device to create a second device hash based on the device state associated with the temporal identifier. The method may include receiving the second device hash and determining that the second device hash matches the authorization hash. In response to the authorization hash matching the received second device hash, the method may include authorizing the login request from the second user device.

In some embodiments, authorizing the login request may be further based upon determining whether the first user device is within a predetermined proximity to the second user device.

In some embodiments, determining whether the first user device is within a predetermined proximity to the second user device may further include receiving a GPS signal from the first user device, determining an IP address associated with the second user device, and determining whether the GPS signal of the first user device is within the predetermined proximity to a source location of the IP address associated with the second user device.

In some embodiments, determining whether the first user device is within a predetermined proximity to the second user device may further include determining whether the first user device is connected to a same local network as the second user device.

In some embodiments, determining whether the first user device is within a predetermined proximity to the second user device may further include determining whether the first user device is within a connectable range to the second user device via a short-range wireless communication protocol.

In some embodiments, the authorization hash and the second device hash may be determined based on one or more of an operating system (OS) version, a screen size of the first user device, a mobile application version, one or more installed applications on the first user device, a media access control (MAC) address associated with the first user device, a processor type of the first user device, application history associated with the first user device, camera statistics associated with the first user device, and device management profiles associated with the first user device.

In some embodiments, the method may further include executing one or more security actions in response to (i) the first user device not being within a predetermined proximity to the second user device or (ii) the authorization hash not matching second device hash. The one or more security actions may include request a second factor authentication before authorizing the login request from the second user device. The one or more security actions may further include denying the login request from the second user device.

In another aspect, another method for preventing an unauthorized login is disclosed. The method may include receiving an authorization request from a first user device. The method may include scanning the first user device to determine a first device state and a temporal identifier associated with the first device state. The method may include creating a first device hash based on the first device state. The method may include storing the first device hash to a memory as an authorization hash. The method may include receiving a login request from a second user device. The method may include receiving a login request from a second user device. The method may include causing the first user device to create one or more second device hashes based on one or more previous device states. The method may include receiving the one or more second device hashes. The method may include determining that at least one of the one or more second device hashes matches the authorization hash. The method may include authorizing the login request from the second user device.

In some embodiments, the one or more second device hashes are determined based on one or more of an operating system (OS) version, a screen size of the first user device, a mobile application version, one or more installed applications on the first user device, a media access control (MAC) address associated with the first user device, a processor type of the first user device, application history associated with the first user device, camera statistics associated with the first user device, and device management profiles associated with the first user device.

In some embodiments, the method may further include, in response to the authorization hash not matching at least one of the one or more second device hashes, execute a security action selected from request a second factor authentication before authorizing the login request from the second user device and denying the login request from the second user device.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation. This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for preventing unauthorized access, comprising:
   one or more authorization processors; and
   a memory in communication with the one or more authorization processors and storing instructions that, when executed by the one or more authorization processors, are configured to cause the system to:
   receive an authorization request from a first user device to register the first user device to access an account;
   scan the first user device to determine a first device fingerprint;
   store the first device fingerprint to the memory as an authorization fingerprint;
   receive a login request from a second user device that has not previously been used to access the account;
   responsive to receiving the login request from the second user device, scan the first user device to determine a second device fingerprint;
   determine whether (i) the first user device is within a predetermined proximity to the second user device and (ii) the authorization fingerprint matches the second device fingerprint beyond a predetermined threshold; and
   responsive to (i) the first user device being within the predetermined proximity to the second user device and (ii) the authorization fingerprint matching the second device fingerprint beyond the predetermined threshold, authorize the login request from the second user device that has not previously been used to access the account.

2. The system of claim 1, wherein determining whether the first user device is within the predetermined proximity to the second user device further comprises:
   receiving a GPS signal from the first user device;
   determining an IP address associated with the second user device; and
   determining whether the GPS signal of the first user device is within the predetermined proximity to a source location of the IP address associated with the second user device.

3. The system of claim 1, wherein determining whether the first user device is within the predetermined proximity to the second user device further comprises determining whether the first user device is connected to a same local network as the second user device.

4. The system of claim 1, wherein determining whether the first user device is within the predetermined proximity to the second user device further comprises determining whether the first user device is within a connectable range to the second user device via a short-range wireless communication protocol.

5. The system of claim 1, wherein determining the first device fingerprint and the authorization fingerprint further comprises:
   scanning the first user device to determine a device state and an associated temporal identifier;
   creating a first device hash based on the determined device state;
   storing the first device hash to the memory as the authorization fingerprint; and
   causing the first user device to create a second device hash based on the device state associated with the temporal identifier.

6. The system of claim 1, wherein the first device fingerprint is determined based on one or more of an operating system (OS) version, a screen size of the first user device, a mobile application version, one or more installed applications on the first user device, a media access control (MAC) address associated with the first user device, a processor type of the first user device, application history associated with the first user device, camera statistics associated with the first user device, and device management profiles associated with the first user device.

7. The system of claim 1, wherein the memory comprises further instructions, that when executed by the one or more authorization processors, are configured to cause the system to:
   responsive to (i) the first user device not being within a predetermined proximity to the second user device or (ii) the authorization fingerprint not matching the second device fingerprint beyond a predetermined threshold, execute one or more security actions.

8. The system of claim 7, wherein the one or more security actions further comprises requesting a second factor authentication before authorizing the login request from the second user device.

9. The system of claim 7, wherein the one or more security actions further comprises denying the login request from the second user device.

10. A method for preventing unauthorized access, comprising:
    receiving an authorization request from a first user device to register the first user device to access an account;
    scanning the first user device to determine a device state and an associated temporal identifier;

creating a first device hash based on the determined device state;

storing the first device hash to a memory as an authorization hash, the authorization hash including the temporal identifier;

receiving a login request from a second user device that has not previously been used to access the account;

responsive to the login request from the second user device, causing the first user device to create a second device hash based on the device state associated with the temporal identifier;

receiving the second device hash;

determining that the received second device hash matches the authorization hash; and responsive to the authorization hash matching the received second device hash, authorizing the login request from the second user device that has not previously been used to access the account.

11. The method of claim 10, wherein authorizing the login request is further based on determining whether the first user device is within a predetermined proximity to the second user device.

12. The method of claim 11, wherein determining whether the first user device is within the predetermined proximity to the second user device further comprises:

receiving a GPS signal from the first user device;

determining an IP address associated with the second user device; and determining whether the GPS signal of the first user device is within the predetermined proximity to a source location of the IP address associated with the second user device.

13. The method of claim 11, wherein determining whether the first user device is within the predetermined proximity to the second user device further comprises determining whether the first user device is connected to a same local network as the second user device.

14. The method of claim 11, wherein determining whether the first user device is within the predetermined proximity to the second user device further comprises determining whether the first user device is within a connectable range to the second user device via a short-range wireless communication protocol.

15. The method of claim 10, wherein the authorization hash and the second device hash are determined based on one or more of an operating system (OS) version, a screen size of the first user device, a mobile application version, one or more installed applications on the first user device, a media access control (MAC) address associated with the first user device, a processor type of the first user device, application history associated with the first user device, camera statistics associated with the first user device, and device management profiles associated with the first user device.

16. The method of claim 11, further comprising:

responsive to (i) the first user device not being within the predetermined proximity to the second user device or (ii) the authorization hash not matching the second device hash, execute one or more security actions.

17. The method of claim 16, wherein the one or more security actions further comprise (i) requesting a second factor authentication before authorizing the login request from the second user device and (ii) denying the login request from the second user device.

18. A method for preventing an unauthorized login, comprising:

receiving an authorization request from a first user device to register the first user device to access an account;

scanning the first user device to determine a first device state and a temporal identifier associated with the first device state;

creating a first device hash based on the first device state;

storing the first device hash to a memory as an authorization hash;

receiving a login request from a second user device that has not previously been used to access the account;

causing the first user device to create one or more second device hashes based on one or more previous device states;

responsive to receiving the login request from the second user device, receiving the one or more second device hashes;

determining that at least one of the one or more second devices hashes matches the authorization hash; and authorizing the login request from the second user device that has not previously been used to access the account.

19. The method of claim 18, wherein the first device hash and the one or more second device hashes are determined based on one or more of an operating system (OS) version, a screen size of the first user device, a mobile application version, one or more installed applications on the first user device, a media access control (MAC) address associated with the first user device, a processor type of the first user device, application history associated with the first user device, camera statistics associated with the first user device, and device management profiles associated with the first user device.

20. The method of claim 18, further comprising:

responsive to the authorization hash not matching at least one of the one or more second device hashes, execute a security action selected from requesting a second factor authentication before authorizing the login request from the second user device and denying the login request from the second user device.

* * * * *